E. E. EINFELDT.
METAL WHEEL.
APPLICATION FILED APR. 15, 1919.

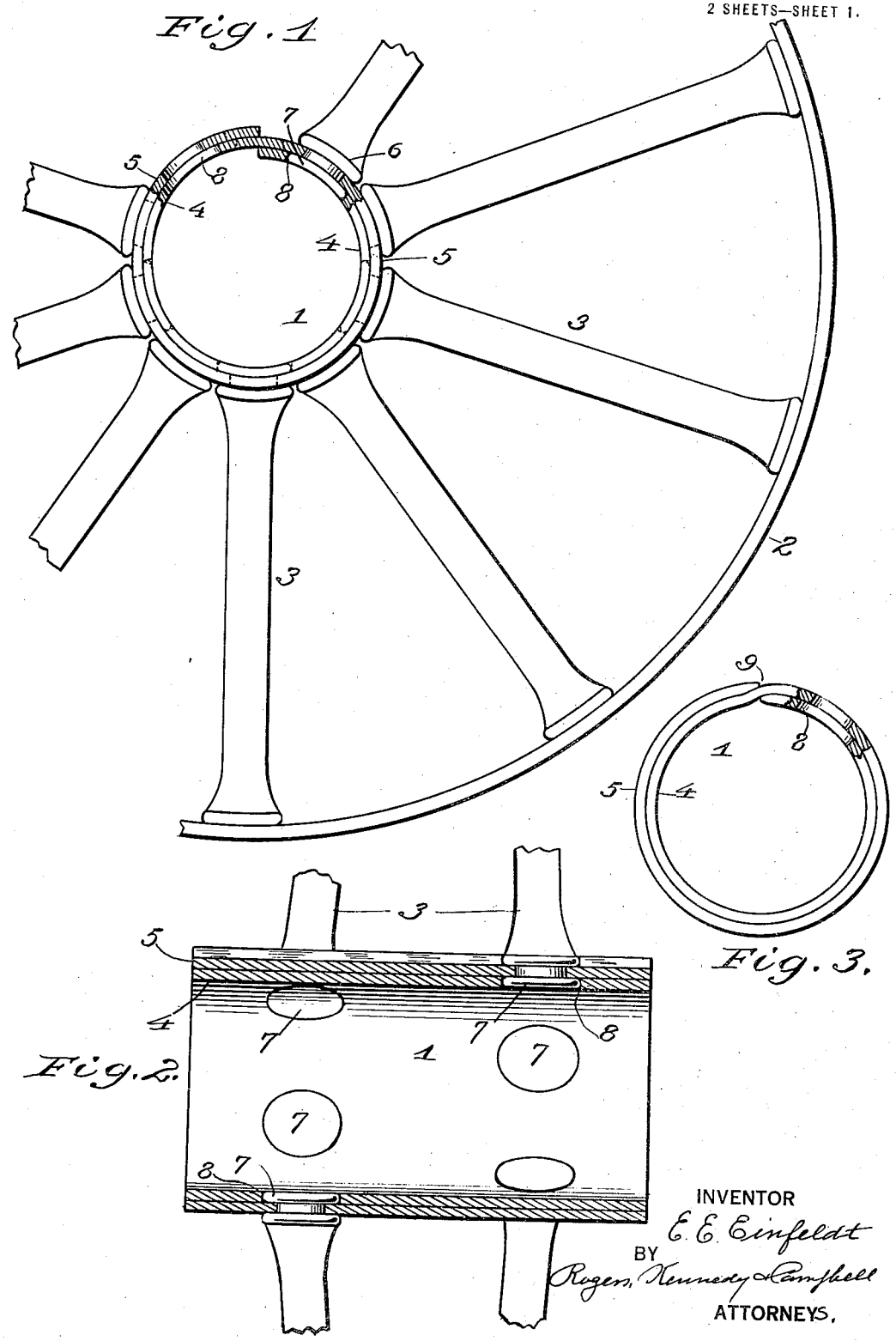

1,327,227.

Patented Jan. 6, 1920.
2 SHEETS—SHEET 2.

INVENTOR
E. E. Einfeldt
BY
Rogers, Kennedy & Campbell
ATTORNEYS.

UNITED STATES PATENT OFFICE.

ERNEST E. EINFELDT, OF DAVENPORT, IOWA, ASSIGNOR TO G. WATSON FRENCH, NATHANIEL FRENCH, JOSEPH L. HECHT, AND W. H. STACKHOUSE, ALL OF DAVENPORT, IOWA, COMPOSING THE FIRM OF FRENCH & HECHT, OF DAVENPORT, IOWA.

METAL WHEEL.

1,327,227.    Specification of Letters Patent.    Patented Jan. 6, 1920.

Application filed April 15, 1919. Serial No. 290,275.

*To all whom it may concern:*

Be it known that I, ERNEST E. EINFELDT, a citizen of the United States, residing at Davenport, in the county of Scott and State of Iowa, have invented certain new and useful Improvements in Metal Wheels, of which the following is a specification, reference being had therein to the accompanying drawing.

This invention relates to metal wheels, and has reference more particularly to the form and construction of the hub and the manner of connecting the spokes thereto. It is the common well-known practice in connecting the spokes to wheel hubs of tubular form, to extend the inner ends of the spokes through the wall of the hub and rivet the spoke thereto by means of a shoulder near the inner end of the spoke bearing against the outer side of the hub, and a head on the inner extremity of the spoke bearing against the inner side of the hub. These end heads, if allowed to project inward of the inner surface of the hub structure, will form obstructions and interfere with the insertion in the hub of the usual bearing box, and to avoid this objection and produce a hub in which the spoke heads will be prevented from thus obstructing the interior of the hub, I propose, in accordance with my invention, to form the hub of a plurality of layers of material, and to form in the inner layer, holes or cavities in which the spoke heads will be received; whereby the heads will not project inward of the surface of the hub, and the usual bearing sleeve may be readily and freely inserted without obstruction, and will receive from the surrounding hub, extended and effective support.

In the accompanying drawings:

Figure 1 is a side elevation of a portion of a wheel having my invention embodied therein in one form, certain parts being broken away to expose other parts to view.

Fig. 2 is a longitudinal sectional elevation of the same.

Fig. 3 is an end elevation of a hub of the form of Fig. 1, showing how the ends of the coiled blank are finished flush on the inner and outer sides of the structure.

Figure 4:
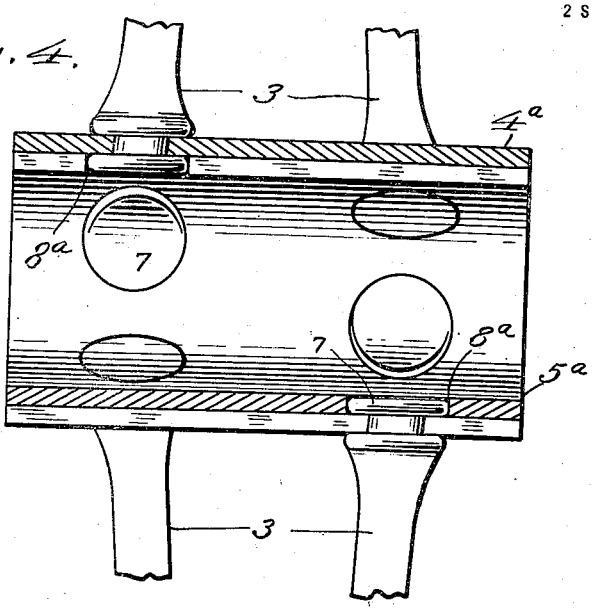
Fig. 4 is a longitudinal section of a hub having my invention embodied therein in a different form.

Referring to the drawings:

Referring particularly to Figs. 1, 2 and 3, 1 designates a wheel hub, 2 a rim, and 3 spokes connected at their outer ends with the rim, and at their inner ends with the hub. The hub is formed of several layers or thicknesses of sheet metal, in the present instance two layers, an inner one 4 and an outer one 5, these layers being of cylindrical form and arranged closely one within the other. In the particular form of the hub shown in Figs. 1 to 3, the layers are formed by coiling or bending a flat blank or plate into cylindrical form, thereby producing an inner coil, and an outer surrounding coil constituting the two layers above referred to, and producing a hollow cylindrical unitary hub structure. The spokes are fastened to the hub by extending their inner ends through holes in the outer layer or coil 5, and forming on the spokes outer shoulders 6 bearing against the outer side of the outer coil, and heads 7 bearing against the inner side of the coil, these heads being seated in cavities or holes 8 in the inner coil. By thus seating the heads in cavities of the inner coil, they will not project inward of the inner surface of the hub, but will be flush therewith. In this way the interior of the hub will be free from obstructions, so that the usual bearing box may be readily inserted in place and will receive solid and extended bearing support from the surrounding surface of the hub.

The spokes connected in this manner to the continuous coiled plate will prevent the coils from unwinding or becoming displaced, thereby preserving the general cylindrical form of the structure. Or if desired, the contacting surfaces of the coils may be spot-welded to connect them together and preserve their cylindrical form.

As shown in Fig. 3, the material of the blank may be bent or offset as at 9, to receive and imbed the ends of the coiled blank to form a finished flush joint.

Figure 5:
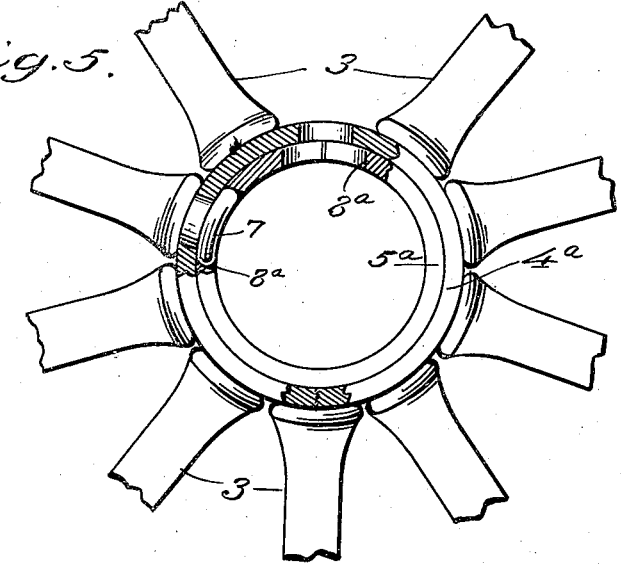
Fig. 5 is an end view of the same, with parts broken away.

In the form of the hub shown in Figs. 4 and 5, the two layers or thicknesses of material are formed by an outer cylindrical collar or section 4ª, and an inner cylindrical collar or section 5ª, which collars may be riveted together or otherwise connected, as by spot-welding, to produce a unitary tubular hub structure. These collars may be either formed of seamless tubing, or sections of pipe, or welded tubing, or they may be rolled or bent into cylindrical form from flat plates, with their ends abutted and welded together or otherwise joined. The inner collar is formed with cavities 8$^a$ to receive the heads on the inner ends of the spokes, which heads, as in the first instance described, bear against the inner side of the outer collar, and in connection with the shoulders bearing against the outer side of the outer collar, effect the firm connection of the spokes with the hub. The spoke heads will thus extend flush with the inner surface of the hub, which latter will be free from obstructions, so that a bearing box may be readily inserted in place and given solid and extended support by the surrounding hub structure.

While the invention is illustrated in the accompanying drawings as being embodied in a hub to which two rows or ranks of spokes are connected, it will be observed that the invention is applicable as well to a hub having a single row of spokes attached.

Having thus described my invention, what I claim and desire to secure by Letters Patent of the United States is as follows:

1. In a wheel, the combination of a hub comprising inner and outer layers of material of cylindrical form, the said inner layer being provided with cavities, and spokes extending at their inner ends through the outer layer and having heads on their inner extremities riveting the spokes to said outer layer, said heads being seated in said cavities in the inner layer; whereby an unobstructed space is left on the interior of the hub for the insertion of a bearing box.

2. In a wheel, the combination of a hub comprising inner and outer layers of material of cylindrical form, the said inner layer being provided with cavities, and spokes extending at their inner ends through the outer layer and having heads on their inner extremities seated in the cavities in the inner layer and bearing against the inner side of the outer layer, and shoulders on said spokes bearing against the outer side of the outer layer.

3. In a wheel, the combination of a hub comprising inner and outer layers of material of cylindrical form, the said inner layer being provided with cavities, and spokes provided with riveting heads and shoulders fastening the spokes to the outer layer, the said heads being seated in the cavities of the inner layer.

In testimony whereof, I have affixed my signature hereto.

ERNEST E. EINFELDT.